US011047668B2

United States Patent
Xu et al.

(10) Patent No.: US 11,047,668 B2
(45) Date of Patent: Jun. 29, 2021

(54) WHEEL SPACE DETECTING DEVICE

(71) Applicant: CITIC Dicastal CO., LTD, Qinhuangdao (CN)

(72) Inventors: Zuo Xu, Qinhuangdao (CN); Guoyuan Xiong, Qinhuangdao (CN); Weidong Liu, Qinhuangdao (CN); Na Zhang, Qinhuangdao (CN); Liangjian Yue, Qinhuangdao (CN); Yingfeng Wang, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 207 days.

(21) Appl. No.: 16/407,708

(22) Filed: May 9, 2019

(65) Prior Publication Data
US 2020/0141711 A1 May 7, 2020

(30) Foreign Application Priority Data
Nov. 2, 2018 (CN) .......................... 201811298010.2

(51) Int. Cl.
*G01B 5/00* (2006.01)
(52) U.S. Cl.
CPC .......... *G01B 5/0025* (2013.01); *G01B 5/0004* (2013.01)
(58) Field of Classification Search
CPC ...... G01B 5/0025; G01B 5/0004; G01B 5/20; G01B 21/02; G01B 21/20; G01M 17/013; B23Q 17/22
USPC ........................................ 33/203.12, 203.13
See application file for complete search history.

(56) References Cited

U.S. PATENT DOCUMENTS

| | | | | |
|---|---|---|---|---|
| 3,499,227 A * | 3/1970 | Krause | .................. | G01B 7/285 33/552 |
| 4,166,323 A * | 9/1979 | Maag | ..................... | G01B 7/283 33/501.9 |
| 5,074,048 A * | 12/1991 | Yokomizo | ............... | G01B 7/28 33/203.13 |
| 5,150,515 A * | 9/1992 | Merrill | .................. | G01B 5/255 33/203.12 |
| 5,151,870 A * | 9/1992 | Beebe | .................... | G01B 5/201 33/203 |
| 6,684,517 B2 * | 2/2004 | Corghi | ................. | G01M 1/045 33/203.12 |
| 10,144,244 B2 * | 12/2018 | Liu | ................... | B23B 31/16258 |

(Continued)

FOREIGN PATENT DOCUMENTS

| CN | 107907081 A | 4/2018 |
|---|---|---|
| CN | 108709737 A | 10/2018 |
| EP | 1830157 A1 | 9/2007 |

*Primary Examiner* — Christopher W Fulton
(74) *Attorney, Agent, or Firm* — Calfee, Halter & Griswold LLP

(57) ABSTRACT

The present application discloses a wheel space detecting device, comprising a frame, a first servo motor, a bottom plate, an adapter shaft, a shaft sleeve, a radial bearing, a lower end cap, a pedestal, a pressure bearing, a base, a clamping cylinder, first linear guide rails, first guide rail sliding seats, first sliding seat frames, racks, first sleeves, first bearings, rotating shafts, first end caps, clamping wheels, a guide rail, and so on. The present invention can meet the needs of wheel brake space detection, has the characteristics of simple structure, stable detection performance, high positioning precision, simple operation and the like, and therefore is very suitable for automatic batch production.

1 Claim, 1 Drawing Sheet

(56) References Cited

U.S. PATENT DOCUMENTS

| | | | |
|---|---|---|---|
| 10,436,568 B2* | 10/2019 | Liu | G01B 5/207 |
| 10,625,388 B2* | 4/2020 | Liu | B23B 5/00 |
| 10,627,313 B2* | 4/2020 | Liu | G01M 17/013 |
| 2018/0149471 A1 | 5/2018 | Lu et al. | |
| 2020/0038895 A1* | 2/2020 | Liu | B05B 12/30 |
| 2020/0141712 A1* | 5/2020 | Wu | G01B 5/12 |
| 2020/0141725 A1* | 5/2020 | Liu | G01M 17/013 |

* cited by examiner

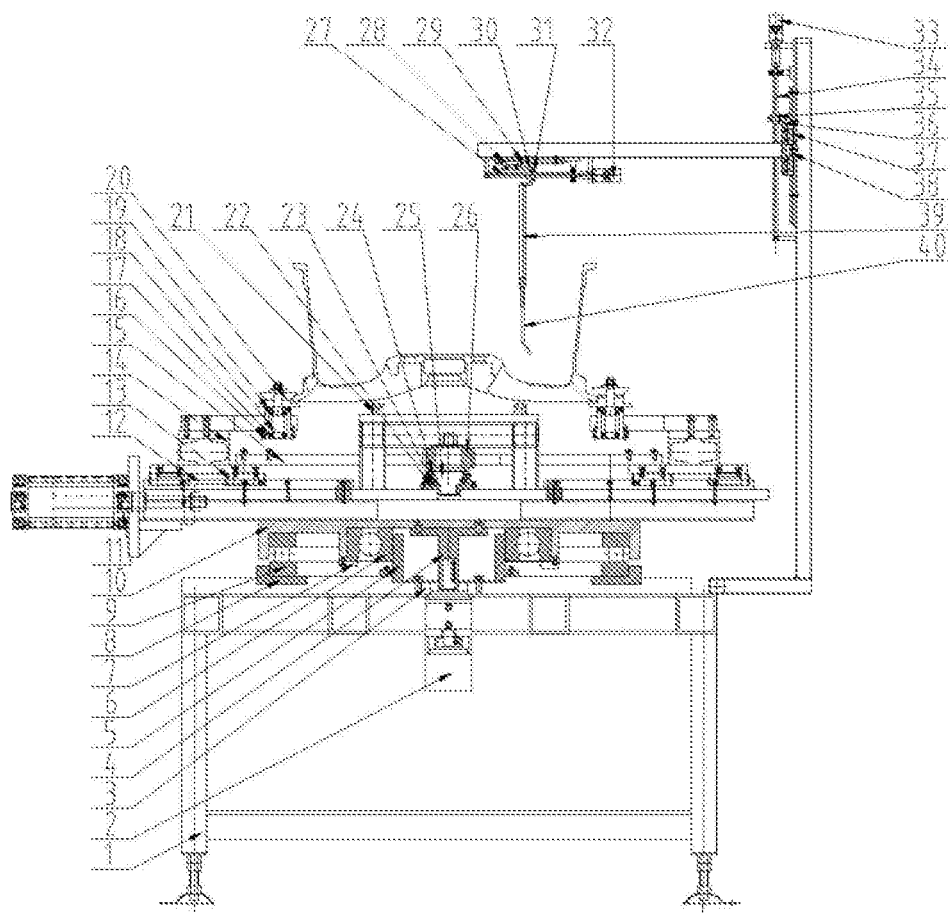

WHEEL SPACE DETECTING DEVICE

CROSS-REFERENCE TO RELATED APPLICATIONS

This application claims priority to Chinese Patent Application No. 201811298010.2, filed on Nov. 2, 2018, which is hereby incorporated by reference in its entirety.

TECHNICAL FIELD

The present application relates to a wheel space detecting device, specifically to a device for automatically detecting a wheel brake space after the completion of wheel machining process.

BACKGROUND ART

As safety parts and exterior parts of a vehicle, wheels need to be assembled on the vehicle. At the same time, the wheel back cavity needs to be equipped with a brake drum, a speed sensor, a balance block and other devices. Therefore, the brake space of the wheel back cavity needs to be comprehensively compatible with the spatial positions of the brake drum, the speed sensor and the balance block. Enterprises usually detect whether the brake space is qualified by adopting a matching gauge such as a detection plate. Such a detection method has the problems of low efficiency, high labor intensity and poor detection effect.

SUMMARY OF THE INVENTION

The objective of the present application is to provide a wheel space detecting device.

In order to achieve the above objective, the technical solution of the present application is: a wheel space detecting device according to the present application consists of a frame, a first servo motor, a bottom plate, an adapter shaft, a shaft sleeve, a radial bearing, a lower end cap, a pedestal, a pressure bearing, a base, a clamping cylinder, first linear guide rails, first guide rail sliding seats, first sliding seat frames, racks, first sleeves, first bearings, rotating shafts, first end caps, clamping wheels, a guide rail, a second sleeve, a second bearing, a second end cap, a shaft, gears, a first lead screw, a second guide rail sliding seat, a second linear guide rail, a second sliding frame, a first lead screw nut, a second servo motor, a third servo motor, a second lead screw, a second lead screw nut, a third sliding frame, a third guide rail sliding seat, a third linear guide rail, a probe holder, and a probe.

The first servo motor, the pedestal and the shaft sleeve are mounted on the frame through the bottom plate; the output shaft of the first servo motor is connected to the base through the adapter shaft; the radial bearing is connected to the shaft sleeve and the base respectively and enclosed in the shaft sleeve and the base by the lower end cap; the pressure bearing is mounted on the pedestal and connected to the base. Through the pressure bearing and the radial bearing, the first servo motor may drive the base to rotate around the axis of the radial bearing with high precision.

The guide rail, the clamping cylinder, the first linear guide rails and the second sleeve are mounted on the base; the second bearing and the shaft are enclosed in the second sleeve through the second end cap, and the gear is mounted at the upper end of the shaft. Left and right clamping execution structures are symmetrically mounted on the base, and one of the first sliding seat frames is connected to one of the first linear guide rails through one of the first guide rail sliding seats; one side of the rack is fixed on one of the first sliding seat frames, and the other side is engaged with the gear; one of the first sleeves is fixed on one of the first sliding seat frames and enclosed inside one of the first sleeves through one of the first end caps, one of the first bearings and one of the first rotating shafts, and the clamping wheels are mounted at the upper end of the rotating shafts; each of the left and right clamping execution structures is provided with two clamping wheels distributed symmetrically; the output shaft of the clamping cylinder is connected to the left first sliding seat frame. Through the synchronization mechanism of the racks and the gear, the clamping cylinder may drive the left-right symmetric clamping execution structures to move synchronously horizontally along the first linear guide rails to achieve high-precision clamping and loosening of a wheel.

The second linear guide rail and the second servo motor are mounted on the third guide rail sliding seat; the second sliding frame is connected to the second linear guide rail through the second guide rail sliding seat; one end of the first lead screw is connected to the second servo motor; the first lead screw nut is mounted on the second guide rail sliding seat and engages with the first lead screw; the probe is mounted on the second sliding frame through the probe holder. The probe may be controlled to move horizontally along the second linear guide rail by controlling the steering and the number of revolutions of the second servo motor.

The third linear guide rail and the third servo motor are mounted on the frame; the third sliding frame is connected to the third linear guide rail through the third guide rail sliding seat; one end of the second lead screw is connected to the third servo motor; the second lead screw nut is mounted on the third guide rail sliding seat and engages with the second lead screw. The third sliding frame may be controlled to move vertically along the third linear guide rail by controlling the steering and the number of revolutions of the third servo motor.

According to the requirements of a wheel detection space, a control system comprehensively controls the steering and the number of revolutions of the second servo motor and the third servo motor through a pre-written running program to control the probe to move linearly along the wheel assembly space.

In actual use, the wheel is transported directly above the device by a transport system, compressed air is introduced, and the clamping cylinder may drive the four uniformly distributed clamping wheels in the left and right symmetric clamping execution structures through the synchronization mechanism of the racks and the gear to move synchronously and concentrically along the first linear guide rails to achieve high-precision clamping of the wheel. Then, the first servo motor starts to work, and the base and the wheel are driven through the pressure bearing and the radial bearing to rotate around the axis of the radial bearing with high precision. According to the requirements of the wheel detection space, a wheel assembly space detecting program is pre-written, the control system of the device comprehensively controls the steering and the number of revolutions of the second servo motor and the third servo motor through the pre-input space detecting program to control the probe to move linearly along the wheel assembly space, the probe synchronously feeds back distance information between wheels to an analysis system of the device, and the analysis system compares the acquired information with the requirements of the wheel product standards, and determines whether the assembly space of the wheel is qualified. So far, the assembly space detection on the wheel is completed.

The present application may meet the needs of wheel brake space detection, has the characteristics of simple structure, stable detection performance, high positioning precision, simple operation and the like, and therefore is very suitable for automatic batch production.

BRIEF DESCRIPTION OF DRAWINGS

FIG. 1 is a structure diagram of a wheel space detecting device according to the present application;

In FIGURES: 1—frame, 2—first servo motor, 3—bottom plate, 4—adapter shaft, 5—shaft sleeve, 6—radial bearing, 7—lower end cap, 8—pedestal, 9—pressure bearing, 10—base, 11—clamping cylinder, 12—first linear guide rails, 13—first guide rail sliding seats, 14—first sliding seat frames, 15—racks, 16—first sleeves, 17—first bearings, 18—rotating shaft, 19—first end caps, 20—clamping wheel, 21—guide rail, 22—second sleeve, 23—second bearing, 24—second end cap, 25—shaft, 26—gear, 27—first lead screw, 28—second guide rail sliding seat, 29—second linear guide rail, 30—second sliding frame, 31—first lead screw nut, 32—second servo motor, 33—third servo motor, 34—second lead screw, 35—second lead screw nut, 36—third sliding frame, 37—third guide rail sliding seat, 38—third linear guide rail, 39—probe holder, 40—probe.

DETAILED DESCRIPTION OF THE INVENTION

The details and working conditions of the specific device according to the present application will be described in detail below in combination with the drawing.

As shown in FIG. 1, a wheel space detecting device according to the present application consists of a frame 1, a first servo motor 2, a bottom plate 3, an adapter shaft 4, a shaft sleeve 5, a radial bearing 6, a lower end cap 7, a pedestal 8, a pressure bearing 9, a base 10, a clamping cylinder 11, first linear guide rails 12, first guide rail sliding seats 13, first sliding seat frames 14, racks 15, first sleeves 16, first bearings 17, rotating shafts 18, first end caps 19, clamping wheels 20, a guide rail 21, a second sleeve 22, a second bearing 23, a second end cap 24, a shaft 25, gears 26, a first lead screw 27, a second guide rail sliding seat 28, a second linear guide rail 29, a second sliding frame 30, a first lead screw nut 31, a second servo motor 32, a third servo motor 33, a second lead screw 34, a second lead screw nut 35, a third sliding frame 36, a third guide rail sliding seat 37, a third linear guide rail 38, a probe holder 39, and a probe 40.

The first servo motor 2, the pedestal 8 and the shaft sleeve 5 are mounted on the frame 1 through the bottom plate 3; the output shaft of the first servo motor 2 is connected to the base 10 through the adapter shaft 4; the radial bearings 6 is connected to the shaft sleeve 5 and the base 10 respectively and enclosed in the shaft sleeve 5 and the base 10 by the lower end cap 7; the pressure bearing 9 is mounted on the pedestal 8 and connected to the base 10. Through the pressure bearing 9 and the radial bearing 6, the first servo motor 2 may drive the base 10 to rotate around the axis of the radial bearing 6 with high precision.

The guide rail 21, the clamping cylinder 11, the first linear guide rails 12 and the second sleeve 22 are mounted on the base 10; the second bearing 23 and the shaft 25 are enclosed in the second sleeve 22 through the second end cap 24, and the gear 26 is mounted at the upper end of the shaft 25. Left and right clamping execution structures are symmetrically mounted on the base 10, and one of the first sliding seat frames 14 is connected to one of the first linear guide rails 12 through one of the first guide rail sliding seats 13; one side of the rack 15 is fixed on one of the first sliding seat frames 14, and the other side is engaged with the gear 26; one of the sleeves 16 is fixed on one of the first sliding seat frames 14 and enclosed inside one of the sleeves 16 through one of the first end caps 19, one of the first bearings 17 and one of the first rotating shafts 18, and the clamping wheels 20 are mounted at the upper end of the rotating shaft 18; each of the left and right clamping execution structures is provided with two clamping wheels 20 distributed symmetrically; the output shaft of the clamping cylinder 11 is connected to the left first sliding seat frame 14. Through the synchronization mechanism of the racks 15 and the gear 26, the clamping cylinder 11 may drive the left-right symmetric clamping execution structures to move synchronously horizontally along the first linear guide rails 12 to achieve high-precision clamping and loosening of a wheel.

The second linear guide rail 29 and the second servo motor 32 are mounted on the third guide rail sliding seat 37; the second sliding frame 30 is connected to the second linear guide rail 29 through the second guide rail sliding seat 28; one end of the first lead screw 27 is connected to the second servo motor 32; the first lead screw nut 31 is mounted on the second guide rail sliding seat 28 and engages with the first lead screw 27; the probe 40 is mounted on the second sliding frame 30 through the probe holder 39. The probe 40 can be controlled to move horizontally along the second linear guide rail 29 by controlling the steering and the number of revolutions of the second servo motor 32.

The third linear guide rail 38 and the third servo motor 33 are mounted on the frame 1; the third sliding frame 36 is connected to the third linear guide rail 38 through the third guide rail sliding seat 37; one end of the second lead screw 34 is connected to the third servo motor 33; the second lead screw nut 35 is mounted on the third guide rail sliding seat 37 and engages with the second lead screw 34. The third sliding frame 36 maybe controlled to move vertically along the third linear guide rail 38 by controlling the steering and the number of revolutions of the third servo motor 33.

According to the requirements of a wheel detection space, a control system comprehensively controls the steering and the number of revolutions of the second servo motor 32 and the third servo motor 33 through a pre-written running program to control the probe 40 to move linearly along the wheel assembly space.

In actual use, the wheel is transported directly above the device by a transport system, compressed air is introduced, and the clamping cylinder 11 may drive the four uniformly distributed clamping wheels 20 in the left and right symmetric clamping execution structures through the synchronization mechanism of the racks 15 and the gear 26 to move synchronously and concentrically along the first linear guide rails 12 to achieve high-precision clamping of the wheel. Then, the first servo motor 2 starts to work, and the base 10 and the wheel are driven through the pressure bearing 9 and the radial bearing 6 to rotate around the axis of the radial bearing 6 with high precision. According to the requirements of the wheel detection space, a wheel assembly space detecting program is pre-written, the control system of the device comprehensively controls the steering and the number of revolutions of the second servo motor 32 and the third servo motor 33 through the pre-input space detecting program to control the probe 40 to move linearly along the wheel assembly space, the probe 40 synchronously feeds back distance information between wheels to an analysis system of the device, and the analysis system compares the acquired information with the requirements of the wheel product standards, and determines whether the assembly space of the wheel is qualified. So far, the assembly space detection on the wheel is completed.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel space detecting device, comprising a frame, a first servo motor, a bottom plate, an adapter shaft, a shaft sleeve, a radial bearing, a lower end cap, a pedestal, a pressure bearing, a base, a clamping cylinder, first linear guide rails, first guide rail sliding seats, first sliding seat frames, racks, first sleeves, first bearings, rotating shafts, first end caps, clamping wheels, a guide rail, a second sleeve, a second bearing, a second end cap, a shaft, gears, a first lead screw, a second guide rail sliding seat, a second linear guide rail, a second sliding frame, a first lead screw nut, a second servo motor, a third servo motor, a second lead screw, a second lead screw nut, a third sliding frame, a third guide rail sliding seat, a third linear guide rail, a probe holder, and a probe, wherein, the first servo motor, the pedestal and the shaft sleeve are mounted on the frame through the bottom plate; the output shaft of the first servo motor is connected to the base through the adapter shaft; the radial bearing is connected to the shaft sleeve and the base respectively and enclosed in the shaft sleeve and the base by the lower end cap; the pressure bearing is mounted on the pedestal and connected to the base, through the pressure bearing and the radial bearing, the first servo motor is configured to drive the base to rotate around the axis of the radial bearing with high precision;

the guide rail, the clamping cylinder, the first linear guide rails and the second sleeve are mounted on the base; the second bearing and the shaft are enclosed in the second sleeve through the second end cap, and the gear is mounted at the upper end of the shaft; left and right clamping execution structures are symmetrically mounted on the base, and one of the first sliding seat frames is connected to one of the first linear guide rails through one of the first guide rail sliding seats; one side of the rack is fixed on one of the first sliding seat frames, and the other side is engaged with the gear; one of the first sleeves is fixed on one of the first sliding seat frames and enclosed inside one of the first sleeves through one of the first end caps, one of the first bearings and one of the rotating shafts, and the clamping wheels are mounted at the upper end of the rotating shafts; each of the left and right clamping execution structures is provided with two clamping wheels distributed symmetrically; the output shaft of the clamping cylinder is connected to the left first sliding seat frame; through the synchronization mechanism of the racks and the gear, the clamping cylinder is configured to drive the left-right symmetric clamping execution structures to move synchronously horizontally along the first linear guide rails to achieve high-precision clamping and loosening of a wheel;

the second linear guide rail and the second servo motor are mounted on the third guide rail sliding seat; the second sliding frame is connected to the second linear guide rail through the second guide rail sliding seat; one end of the first lead screw is connected to the second servo motor; the first lead screw nut is mounted on the second guide rail sliding seat and engages with the first lead screw; the probe is mounted on the second sliding frame through the probe holder; the probe is configured to be controlled to move horizontally along the second linear guide rail by controlling the steering and the number of revolutions of the second servo motor;

the third linear guide rail and the third servo motor are mounted on the frame; the third sliding frame is connected to the third linear guide rail through the third guide rail sliding seat; one end of the second lead screw is connected to the third servo motor; the second lead screw nut is mounted on the third guide rail sliding seat and engages with the second lead screw; the third sliding frame is configured to be controlled to move vertically along the third linear guide rail by controlling the steering and the number of revolutions of the third servo motor.

* * * * *